United States Patent
Badea et al.

(10) Patent No.: US 10,212,125 B2
(45) Date of Patent: Feb. 19, 2019

(54) METHODS, SYSTEMS, AND COMPUTER READABLE MEDIA FOR TESTING NETWORK EQUIPMENT DEVICES USING CONNECTION-ORIENTED PROTOCOLS

(71) Applicant: Ixia, Calabasas, CA (US)

(72) Inventors: Alexandru Badea, Bucharest (RO); George Ciobanu, Town Vaslui (RO); Emilian-Mihai Filipescu, Ramnicu Valcea (RO); Marius-Gabriel Ionescu, Ploiesti/Prahova (RO)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 332 days.

(21) Appl. No.: 15/095,025

(22) Filed: Apr. 9, 2016

(65) Prior Publication Data

US 2017/0295137 A1    Oct. 12, 2017

(30) Foreign Application Priority Data

Apr. 8, 2016 (RO) ................. 2016 00250

(51) Int. Cl.
 *H04L 29/12* (2006.01)
 *H04L 12/26* (2006.01)
 (Continued)

(52) U.S. Cl.
 CPC .......... *H04L 61/2571* (2013.01); *H04L 43/18* (2013.01); *H04L 43/50* (2013.01);
 (Continued)

(58) Field of Classification Search
 None
 See application file for complete search history.

(56) References Cited

U.S. PATENT DOCUMENTS 7,643,431 B2   1/2010   Pepper
8,050,172 B2   11/2011  Pepper
(Continued)

OTHER PUBLICATIONS

"Making Dollar$ and Sense Out of Enterprise Security Testing," Ixia White Paper, 915-6784-01 Rev. C, pp. 1-16 (Apr. 2015).
(Continued)

*Primary Examiner* — Ayaz R Sheikh
*Assistant Examiner* — Sori A Aga (57) ABSTRACT

The subject matter described herein relates to methods, systems, and computer readable media for testing network equipment devices using connection-oriented protocols. In some examples, a method for testing a network equipment device under test (DUT) includes executing, by a network equipment test device, a test script to test the network equipment DUT using a connection-oriented protocol. The method includes inserting, during a connection establishment process of the connection-oriented protocol for a network flow to the network equipment DUT, a flow-identifying sequence number into a sequence number field of a first message of the network flow. The flow-identifying sequence number is a number uniquely identifying the network flow from other network flows. The method includes receiving a second message from the network equipment DUT and determining that the second message belongs to the network flow by extracting the flow-identifying sequence number from the second message.

17 Claims, 4 Drawing Sheets

(51) Int. Cl.
   *H04L 12/851* (2013.01)
   *H04L 12/801* (2013.01)
(52) U.S. Cl.
   CPC .......... *H04L 47/2483* (2013.01); *H04L 47/34* (2013.01); *H04L 61/2514* (2013.01); *H04L 43/026* (2013.01); *H04L 47/16* (2013.01); *H04L 61/256* (2013.01)

(56) References Cited

U.S. PATENT DOCUMENTS

| | | |
|---|---|---|
| 8,050,175 B2 | 11/2011 | Pepper |
| 8,612,530 B1 * | 12/2013 | Sapovalovs ............. H04L 43/50 707/602 |
| 8,855,141 B2 | 3/2014 | Filipescu et al. |
| 8,724,473 B2 | 5/2014 | Bancila et al. |
| 2009/0262743 A1 * | 10/2009 | Uyehara ................. H04L 43/08 370/394 |
| 2015/0212914 A1 | 7/2015 | Nistor et al. |
| 2016/0156541 A1 | 6/2016 | Nistor et al. |
| 2016/0174178 A1 | 6/2016 | Nistor |

OTHER PUBLICATIONS

"Transmission Control Protocol," DARPA Internet Program Protocol Specification, RFC 793, pp. 1-85 (Sep. 1981).

* cited by examiner

METHODS, SYSTEMS, AND COMPUTER READABLE MEDIA FOR TESTING NETWORK EQUIPMENT DEVICES USING CONNECTION-ORIENTED PROTOCOLS

PRIORITY CLAIM

This application claims the benefit of Romanian Patent Application No. a 2016 00250 filed Apr. 8, 2016; the disclosure of which is incorporated herein by reference in its entirety.

TECHNICAL FIELD

The subject matter described herein relates generally to communications test systems. More particularly, the subject matter described herein relates to methods, systems, and computer readable media for testing network equipment devices using connection-oriented protocols.

BACKGROUND

Network test systems can measure and test various aspects of data communications networks such as network performance and service status. Network test systems can be used to detect and resolve network issues, improving network performance and user experience. Some network test systems operate by executing test scripts to transmit data over a data communications network at one endpoint and receive the data at another endpoint. The received data can be compared to the transmitted data to determine some aspects of network performance, such as whether a particular network device is operating according to performance specifications of the network device.

In some network test systems, test scripts can be configured to track network flows to determine some aspects of network performance. For example, a network test system transmitting test messages using a connection-oriented protocol (e.g., transmission control protocol (TCP)) can track network flows using the connection setup and tear down messages. In another example, a network test system transmitting test messages using a connectionless protocol (e.g., user datagram protocol (UDP)) can track network flows using variables stored in message headers such as Internet protocol (IP) type, source IP address, source port, destination IP address, and destination port. In that case, the network test system will be unable to track flows where intervening network equipment alters the variables used. For example, in a network address translation (NAT) testing environment, at least one IP address will be translated, thus making it difficult to identify the originating flow on the receiving end of the transmission.

In light of these difficulties, there exists a need for methods, systems, and computer readable media for testing network equipment devices using connectionless protocols.

SUMMARY

The subject matter described herein relates to methods, systems, and computer readable media for testing network equipment devices using connection-oriented protocols. In some examples, a method for testing a network equipment device under test (DUT) includes executing, by a network equipment test device including at least one processor, a test script to test the network equipment DUT by sending network traffic to and receiving network traffic from the network equipment DUT using a connection-oriented protocol. The method includes inserting, during a connection establishment process of the connection-oriented protocol for a network flow to the network equipment DUT, a flow-identifying sequence number into a sequence number field of a first message of the network flow. The flow-identifying sequence number is a number uniquely identifying the network flow from other network flows. The method includes receiving a second message from the network equipment DUT and determining that the second message belongs to the network flow by extracting the flow-identifying sequence number from the second message.

The subject matter described in this specification may be implemented in hardware, software, firmware, or combinations of hardware, software and/or firmware. In some examples, the subject matter described in this specification may be implemented using a non-transitory computer readable medium storing computer executable instructions that when executed by one or more processors of a computer cause the computer to perform operations. Computer readable media suitable for implementing the subject matter described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described in this specification may be located on a single device or computing platform or may be distributed across multiple devices or computing platforms.

DETAILED DESCRIPTION

Figure 1:
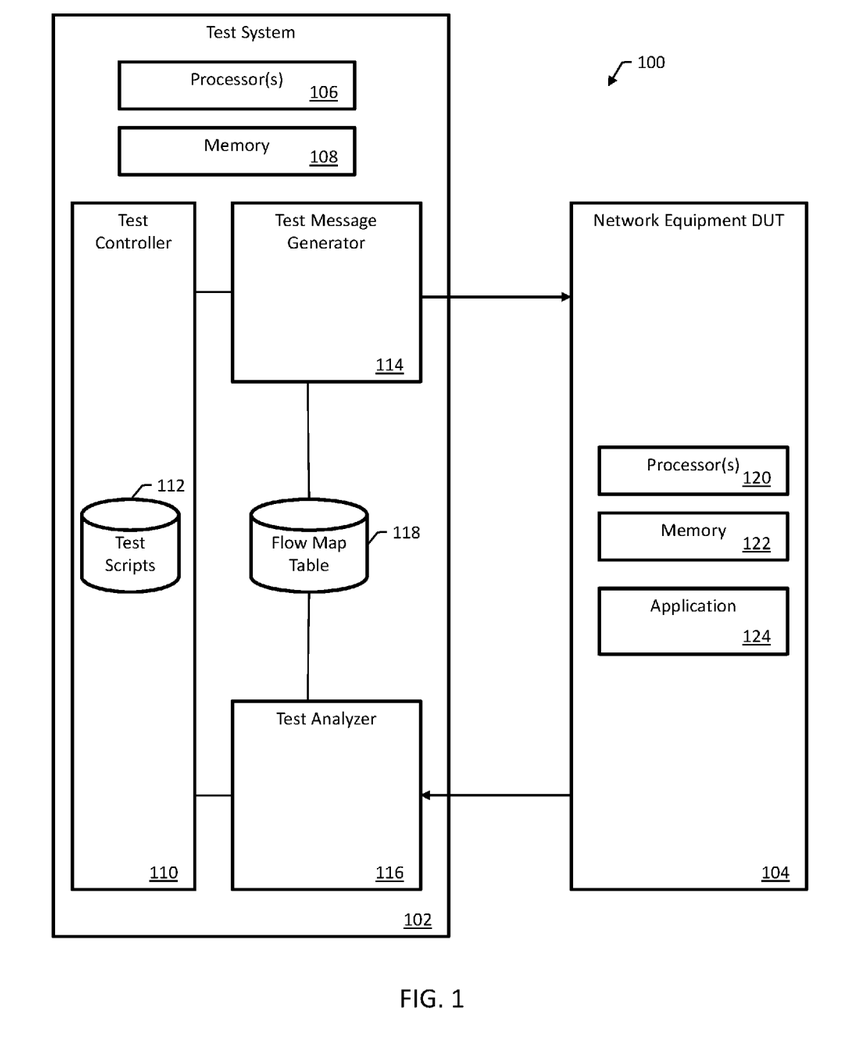
FIG. 1 is a block diagram of an example communications environment including a network equipment test device configured to test a network equipment device under test (DUT)

FIG. 1 is a block diagram of an example communications environment 100 including a network equipment test device 102 configured to test a network equipment device under test (DUT) 104. Network equipment test device 102 may be one or more physical devices that send test messages to DUT 104 and that monitors the response of DUT 104.

Network equipment test device 102 includes one or more processors 106 and memory 108. Memory 108 can store executable instructions for processors 106 that, when executed by processors 106, causes processors 106 to perform operations for testing DUT 104. The instructions can include software that is loaded into random access memory (RAM) and executed by processors 106.

Network equipment test device 102 includes a test controller 110, implemented using processors 106 and memory 108, for executing one or more test scripts selected from a repository of test scripts 112. A test script specifies a sequence of messages to be exchanged over a data communications network. A message can be, e.g., an Internet protocol (IP) packet or a related number of IP packets or other packets. In general, a message includes header information and a payload, and the header information includes network routing information and the payload includes information to be consumed at the destination of the message. A test script can specify various other data for implementing a test, for example, failure conditions that test controller 110 can use to determine whether a given test is successful.

Network equipment test device 102 includes a test message generator 114 and a test analyzer 116 that are implemented using processors 106 and memory 108. Test message generator 114 and test analyzer 116 can be implemented as, for example, two separate software processes executing on a computer system, or as two separate hardware units under control of the test controller 110 by separate data connections. Test controller 110 uses test message generator 114 and test analyzer 116 to exchange sequences of messages by way of a data communications network connection that passes through DUT 104. Test analyzer 116 is configured for analyzing received messages in accordance with the test script and producing test reports for DUT 104 based on analyzing the received messages.

DUT 104 can be any appropriate type of network equipment device. For example, DUT 104 can be a router, a firewall, or a network address translation (NAT) gateway or firewall. DUT 104 includes one or more processors 120 and memory 122. Memory 122 can store executable instructions for processors 106 that, when executed by processors 106, causes processors 106 to perform network operations. The instructions can include software that is loaded into random access memory (RAM) and executed by processors 106. For example, DUT 104 includes an application 124 that is configured to perform a network function, e.g., a network address translation function or any appropriate network function.

Network address translation can include remapping one IP address space into another by modifying network address information in IP packet headers while the packets are in transit. For example, network address translation can hide an IP address space of private network IP addresses behind a single IP address in a public address space. In some examples, DUT 104 operates as a NAT gateway by using stateful translation tables to map IP addresses from one IP address space to another.

Test message generator 114 and test analyzer 116 are configured to track network flows using a flow map table 118. A network flow is a sequence of messages from a source computer system to a destination. The destination can be another computer system or a group of computer systems, e.g., a multicast group or a broadcast domain. For example, a network flow can be all of the packets or datagrams in a specific transport connection or media stream. In the case where test message generator 114 and test analyzer 116 are using TCP/IP, a network flow can include all IP packets matching a flow tuple. A flow tuple includes a number of variables related to the source and destination addresses. For example, the flow tuple can include the source IP address, the source port, the destination IP address, the destination port, and optionally the protocol in use (i.e., TCP in this case, or a Layer 4 protocol in general).

Tracking network flows can be useful for, e.g., producing certain kinds of test reports or running certain kinds of tests on DUT 104. In some cases, however, test message generator 114 and test analyzer 116 cannot use a flow tuple to track network flows because one or more of the variables in the flow tuple are altered during a test. For example, suppose that DUT 104 is a NAT gateway, e.g., a source NAT (SNAT) or destination NAT (DNAT). DUT 104 will alter the destination IP address or destination port or both of messages from test message generator 114 that are addressed to test analyzer 116.

In such cases, test message generator 114 and test analyzer 116 can track network flows using flow-identifying sequence numbers that uniquely identify each flow. Test message generator 114 and test analyzer 116 can use a connection establishment process of the connection-oriented protocol to determine how DUT 104 is translating addresses. For example, where the connection-oriented protocol is TCP/IP, test message generator 114 and test analyzer 116 can use one or more of the message in the three-way handshake process, including the SYN message, the SYN-ACK message, and the ACK message.

During the connection establishment process for a new flow, test message generator 114 can insert a flow-identifying sequence number into a sequence number field of a first message of the network flow. For example, the first message can be a TCP SYN message, and test message generator 114 can insert the flow-identifying sequence number in the sequence number field of the TCP header of the TCP SYN message. The flow-identifying sequence number uniquely identifies the network flow from any other flows originated by test message generator 114. Test analyzer 116 receives a second message from DUT 104 and determines that the second message belongs to the network flow by extracting the flow-identifying sequence number from the second message.

In some examples, test message generator 114 can be configured for storing a record for the network flow in flow map table 118. The record includes the flow-identifying sequence number for the network flow. The record can also include a flow tuple for the first message. For example, test message generator 114 may determine that flow map table 118 lacks a record for the network flow by searching flow map table 118 for the flow tuple of the first message and, in response, add the record for the network flow to the flow map table.

Test analyzer 116 can determine that the second message belongs to the network flow by looking up the record for the network flow in the flow map table using the flow-identifying sequence number extracted from the second message. Test analyzer 116 can then capture a flow tuple from the second message and add the flow tuple for the second message to the record for the network flow. Test message generator 114 and test analyzer 116 can then use the flow tuples in the record for the flow for tracking one or more subsequently received messages belonging to the network flow, e.g., to conserve computing resources. By adding the flow tuple for the second message to the record for the network flow in flow map table 118, test analyzer 116 can determine that the subsequent messages belong to the network flow by searching for the flow tuples of the subsequent messages in flow map table 118, thus avoiding the insertion and extraction of the flow-identifying sequence number.

Test message generator 114 can generate the flow-identifying sequence numbers using any appropriate process for determining and assigning unique identifiers. For example, test message generator 114 can generate the flow-identifying sequence number for the network flow based on a memory address of the record for the network flow in flow map table 118. The memory address can be used as a seed to a random or pseudo random number generator. Since the memory address of the record will be unique to the network flow, the resulting flow-identifying sequence number will also be unique to the network flow.

Figure 2:
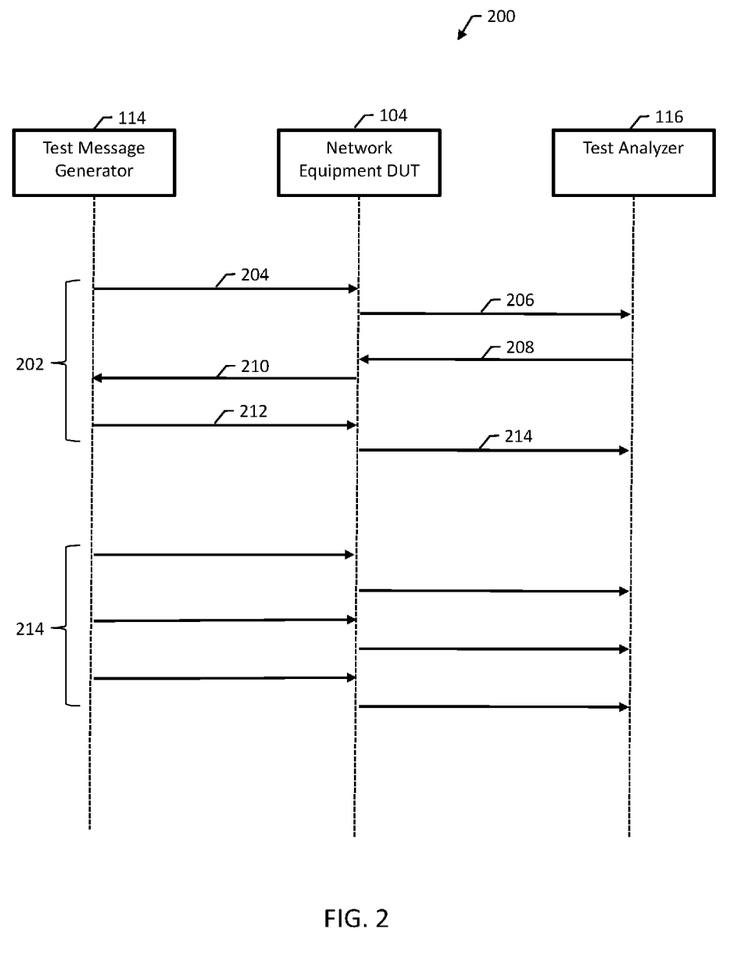
FIG. 2 is a message diagram illustrating an example exchange of a sequence of messages.
Figure 3A:
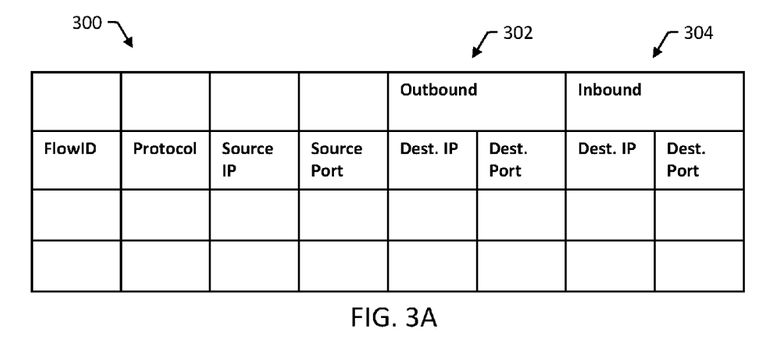
FIGS. 3A-C illustrate an example flow map table.
Figure 3B:
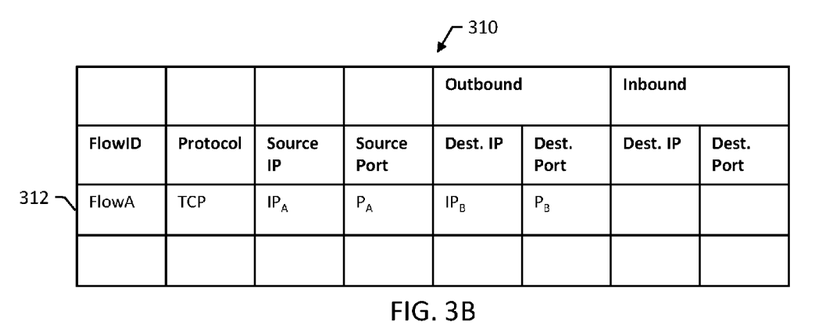
Figure 3C:
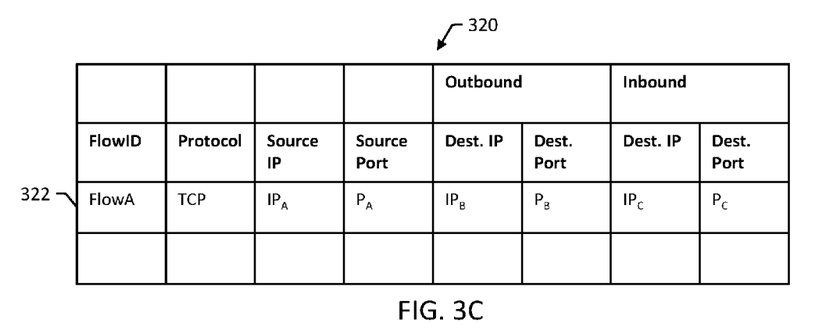

FIG. 2 is a message diagram 200 illustrating an example exchange of a sequence of messages. FIGS. 3A-C illustrate states of an example flow map table during the sequence of messages illustrated in message diagram 200. FIGS. 2 and 3A-C will be described together for purposes of illustration.

FIG. 3A shows an initial flow map table 300. Flow map table 300 includes columns for a flow identifier, a communications protocol for a flow, a source IP address and source port. Flow map table 300 also includes columns for a destination IP address and a destination port. Flow map table 300 includes columns for the destination IP address and destination port of outbound messages 302, i.e., messages being sent from the source to the destination, and for inbound messages 304, i.e., messages being received at the destination after the destination IP address and destination port have been translated. Initial flow map table 300 is initially empty, i.e., does not include any flow records.

Referring to FIG. 2, test message generator 114 performs a connection establishment process with test analyzer 116 by exchanging a series of messages 202, e.g., the messages of the three-way TCP handshake. Test message generator transmits a first message 204 for a network flow to DUT 104 according to a test script. Test message generator 114 stores a record for the network flow in the flow map table 300, e.g., either before or after or at the same time as transmitting first message 204.

FIG. 3B shows the flow map table 310 after test message generator 114 adds a record 312 for the network flow for first message 204. Record 312 includes a flow-identifying sequence number, FlowA, which is inserted into a sequence number field of first message 204. Record 312 also includes the values for the flow tuple extracted from first message 202, i.e., that the protocol is TCP, source IP address and source port are $IP_A$ and $P_A$, and that first message 202 includes a destination IP address and port of $IP_B$ and $P_B$.

Referring to FIG. 2, DUT 104 translates the destination IP address of first message 204 and transmits a second message 206 that includes the payload of first message 204 and a different destination IP address or destination source or both. Test analyzer 116 receives second message 206 and extracts the flow-identifying sequence number from the sequence number field of second message 206.

Test analyzer 116 matches the extracted flow-identifying sequence number to record 312 in flow map table 310 and determines that second message 206 belongs to the same flow as first message 204. In response, test analyzer 116 extracts the flow tuple from second message 206 and adds the flow tuple to the flow map table 310.

FIG. 3C shows the flow map table 320 after test analyzer adds the flow tuple for second message 206 to the record 322 for the network flow. Record 322 now includes information specifying that second message 206 included a destination IP address and port of $IP_C$ and $P_C$, indicating that DUT 104 translated $IP_B$ and $P_B$ to $IP_C$ and $P_C$.

Referring to FIG. 2, test message generator 114 and test analyzer 116 complete the connection establishment process. Test analyzer 116 sends message 208, which can be a TCP SYN-ACK message, and DUT 104 translates the address of message 208, resulting in message 210. Test message generator 114 responds with message 212, which can be a TCP ACK message, and DUT 104 translates the address of message 212, resulting in message 214.

Test message generator 114 sends a number of subsequent messages 214 to DUT 104. DUT 104 sends translated messages to test analyzer 116. Test analyzer 116 can determine that the subsequent messages 214 belong to the network flow by extracting the flow tuples of the subsequent messages 214 and matching them to $IP_C$ and $P_C$ in flow map table 320. Test analyzer 116 can start a new flow by sending responsive messages back to test message generator 114, and the new flow can be tracked in the same manner.

Figure 4:
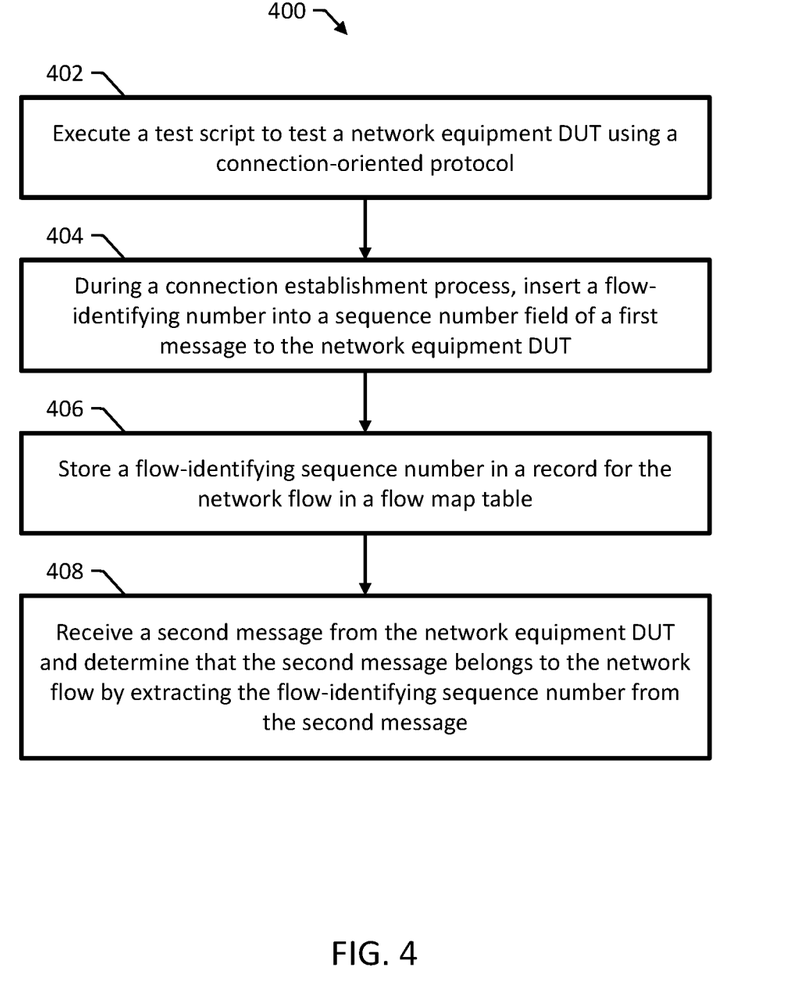
FIG. 4 is a flow chart of an example method for testing a network equipment DUT.

FIG. 4 is a flow chart of an example method 400 for testing a network equipment DUT. The method is performed by a network equipment test device, e.g., the network equipment test device 102 of FIG. 1. The network equipment test device executes a test script to test the network equipment DUT by sending and receiving network traffic to the network equipment DUT using a connection-oriented protocol, e.g., TCP/IP (402).

During a connection establishment process of the connection-oriented protocol for a network flow to the network equipment DUT, the network equipment test device inserts a flow-identifying sequence number into a sequence number field of a first message of the network flow (404). The flow-identifying sequence number is a number uniquely identifying the network flow from any other network flows originating from the network equipment test device. The first message can be, e.g. a TCP SYN message, and the network equipment test device can insert the flow-identifying sequence number into the sequence number field of the TCP header of the TCP SYN message. The network equipment test device can store the flow-identifying sequence number in a record for the network flow in a flow map table along with a flow tuple for the first message (406).

The network equipment test device receives a second message from the network equipment DUT and determines that the second message belongs to the network flow by extracting the flow-identifying sequence number from the sequence number field of the second message (408). For example, the network equipment test device can look up the record for the network flow in the flow map table using the extracted flow-identifying sequence number.

The network equipment test device can capture the flow tuple from the second message and add the flow tuple for the second message to the record for the network flow. Then the network equipment test device can determine that subsequently received messages belong to the network flow using the flow tuple from the second message. The network equipment test device analyzes the subsequently received message in accordance with the test script and produces a test report for the network equipment DUT based on analyzing the subsequently received messages.

Accordingly, while the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for testing a network equipment device under test (DUT), the system comprising:
   a network equipment test device including at least one processor and configured to test the network equipment DUT by sending network traffic to and receiving network traffic from the network equipment DUT using a connection-oriented protocol;
   a test message generator implemented on the network equipment test device and configured for inserting, during a connection establishment process of the connection-oriented protocol for a network flow to the network equipment DUT, a flow-identifying sequence number into a sequence number field of a first message of the network flow, wherein the flow-identifying sequence number is a number uniquely identifying the network flow from a plurality of other network flows, and wherein inserting the flow-identifying sequence number comprises storing the flow-identifying sequence number in a record for the network flow in a flow map table, capturing a flow tuple from the first message, and associating the flow tuple with the record for the network flow in the flow map table; and
   a test analyzer implemented on the network equipment test device and configured for receiving a second message from the network equipment DUT and determining that the second message belongs to the network flow by extracting the flow-identifying sequence number from the second message, wherein the test analyzer is configured for capturing a different flow tuple from the second message, adding the different flow tuple to the record for the network flow, and determining that one or more subsequently received messages belong to the network flow using the different flow tuple.

2. The system of claim 1, wherein the connection-oriented protocol is the transmission control protocol over Internet protocol (TCP/IP).

3. The system of claim 2, wherein the first message a TCP SYN message, and wherein the sequence number field of the first message is the sequence number field of a TCP header of the TCP SYN message.

4. The system of claim 1, wherein the network equipment DUT comprises a network address translation (NAT) device configured to translate an Internet protocol (IP) address of the first message without modifying the sequence number field of the first message.

5. The system of claim 1, wherein determining that the second message belongs to the network flow comprises looking up the record for the network flow in the flow map table using the flow-identifying sequence number extracted from the second message.

6. The system of claim 1, wherein inserting the flow-identifying sequence number comprises generating the flow-identifying sequence number based on a memory address of the record for the network flow in the flow map table.

7. The system of claim 1, wherein inserting the flow-identifying sequence number comprises determining that the flow map table lacks a record for the network flow using the flow tuple, and, in response, adding the record for the network flow to the flow map table.

8. The system of claim 1, wherein the test analyzer is configured for analyzing the subsequently received messages in accordance with a test script and producing a test report for the network equipment DUT based on analyzing the subsequently received messages.

9. A method for testing a network equipment device under test (DUT), the method comprising:
   executing, by a network equipment test device including at least one processor, a test script to test the network equipment DUT by sending network traffic to and receiving network traffic from the network equipment DUT using a connection-oriented protocol;
   inserting, during a connection establishment process of the connection-oriented protocol for a network flow to the network equipment DUT, a flow-identifying sequence number into a sequence number field of a first message of the network flow, wherein the flow-identifying sequence number is a number uniquely identifying the network flow from a plurality of other network flows, and wherein inserting the flow-identifying sequence number comprises storing the flow-identifying sequence number in a record for the network flow in a flow map table, capturing a flow tuple from the first message, and associating the flow tuple with the record for the network flow in the flow map table;
   receiving a second message from the network equipment DUT and determining that the second message belongs to the network flow by extracting the flow-identifying sequence number from the second message;
   capturing a different flow tuple from the second message;
   adding the different flow tuple to the record for the network flow; and
   determining that one or more subsequently received messages belong to the network flow using the different flow tuple.

10. The method of claim 9, wherein the connection-oriented protocol is the transmission control protocol over Internet protocol (TCP/IP).

11. The method of claim 10, wherein the first message a TCP SYN message, and wherein the sequence number field of the first message is the sequence number field of a TCP header of the TCP SYN message.

12. The method of claim 9, wherein the network equipment DUT comprises a network address translation (NAT) device configured to translate an Internet protocol (IP) address of the first message without modifying the sequence number field of the first message.

13. The method of claim 9, wherein determining that the second message belongs to the network flow comprises looking up the record for the network flow in the flow map table using the flow-identifying sequence number extracted from the second message.

14. The method of claim 9, wherein inserting the flow-identifying sequence number comprises generating the flow-identifying sequence number based on a memory address of the record for the network flow in the flow map table.

15. The method of claim 9, wherein inserting the flow-identifying sequence number comprises determining that the flow map table lacks a record for the network flow using the flow tuple, and, in response, adding the record for the network flow to the flow map table.

16. The method of claim 9, comprising analyzing the subsequently received messages in accordance with a test script and producing a test report for the network equipment DUT based on analyzing the subsequently received messages.

17. One or more non-transitory computer readable mediums storing instructions for a network equipment test device comprising at least one processor that, when executed by the at least one processor, cause the at least one processor to perform operations comprising:

executing a test script to test a network equipment DUT by sending network traffic to and receiving network traffic from the network equipment DUT using a connection-oriented protocol;

inserting, during a connection establishment process of the connection-oriented protocol for a network flow to the network equipment DUT, a flow-identifying sequence number into a sequence number field of a first message of the network flow, wherein the flow-identifying sequence number is a number uniquely identifying the network flow from a plurality of other network flows, and wherein inserting the flow-identifying sequence number comprises storing the flow-identifying sequence number in a record for the network flow in a flow map table, capturing a flow tuple from the first message, and associating the flow tuple with the record for the network flow in the flow map table;

receiving a second message from the network equipment DUT and determining that the second message belongs to the network flow by extracting the flow-identifying sequence number from the second message;

capturing a different flow tuple from the second message;

adding the different flow tuple to the record for the network flow; and determining that one or more subsequently received messages belong to the network flow using the different flow tuple.

* * * * *